United States Patent [19]

Ueda

[11] 4,324,419
[45] Apr. 13, 1982

[54] LATCH FOR RUNNER UTILIZED IN PASSIVE TYPE SEAT BELT SYSTEM

[75] Inventor: Takeo Ueda, Fujisawa, Japan

[73] Assignee: Nippon Seiko Kabushiki Kaisha, Tokyo, Japan

[21] Appl. No.: 148,779

[22] Filed: May 12, 1980

[30] Foreign Application Priority Data

Jun. 6, 1979 [JP] Japan .............................. 54-75857[U]

[51] Int. Cl.³ .............................................. B60R 21/10
[52] U.S. Cl. .................................................... 280/804
[58] Field of Search ................ 280/804, 803, 802, 808; 297/468, 474

[56] References Cited

U.S. PATENT DOCUMENTS

| | | | |
|---|---|---|---|
| 3,494,664 | 2/1970 | States | 297/468 |
| 3,630,543 | 12/1971 | Cripps | 297/474 |
| 3,915,472 | 10/1975 | Lindblad | 280/803 |
| 3,927,902 | 12/1975 | Lindblad | 280/804 |
| 3,971,570 | 7/1976 | Nilsson | 280/804 |
| 4,159,848 | 7/1979 | Manz | 280/804 |
| 4,213,652 | 7/1980 | Irwin | 280/804 |
| 4,232,885 | 11/1980 | Suzuki | 280/804 |

Primary Examiner—Robert R. Song
Attorney, Agent, or Firm—Shapiro and Shapiro

[57] ABSTRACT

A latch device for a runner member used in a passive seat belt system includes a longitudinally extending guide member, a runner member movably mounted on the guide member and having an engaging portion and webbing attached thereto, a driving member for moving the runner member between a passenger restraining position and a passenger releasing position, and a latch member movably mounted on a base member between an engaging position in which the latch member is engageable with the engaging portion of the runner member and a non-engaging position. The latch member is biased toward the engaging position. A cam member is fixed to the driving member, and a slide member, which connects the runner member with the driving member, is slidable relative to the driving member within a predetermined range. The cam member moves the latch member into the non-engaging position when the runner member is about to leave the passenger restraining position together with the driving member.

5 Claims, 7 Drawing Figures

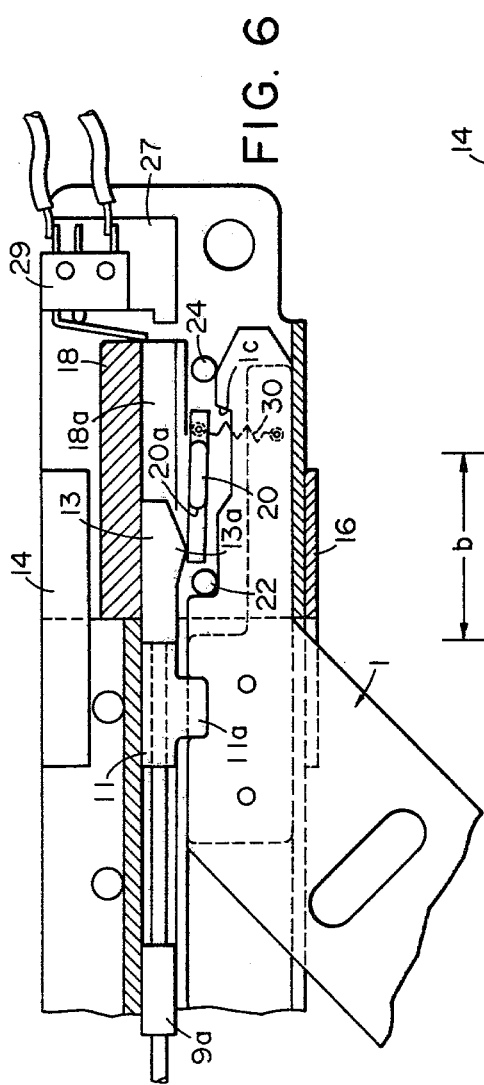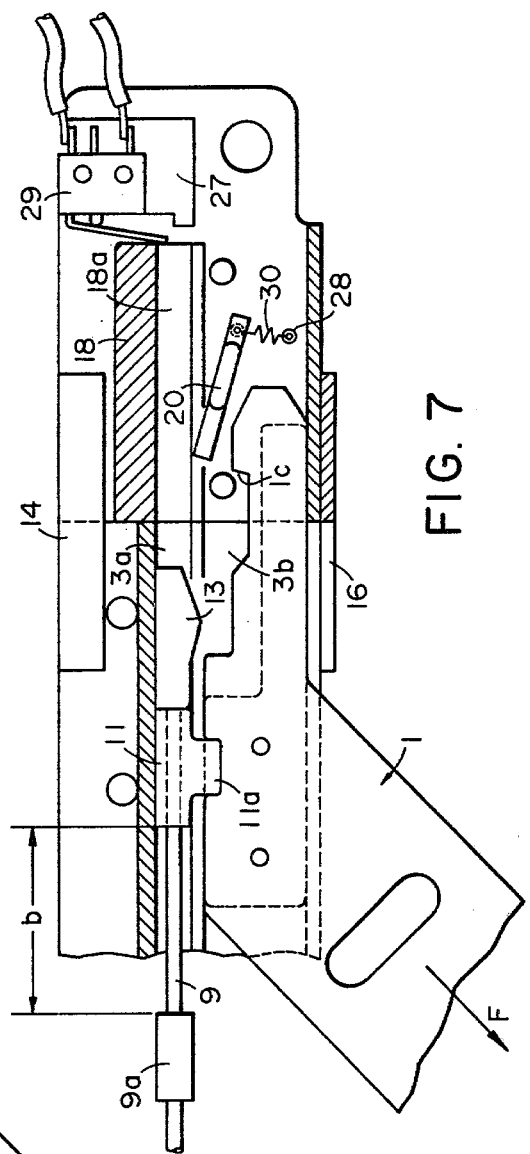

LATCH FOR RUNNER UTILIZED IN PASSIVE TYPE SEAT BELT SYSTEM

BACKGROUND OF THE INVENTION

1. Field of the Invention

The present invention relates to a latch device for a runner member used in a passive type seat belt system. More particularly the present invention relates to a latch device which automatically latches the runner when it comes to its passenger restraining position in association with closing of a door or the like and automatically unlatches the runner when it is about to move from the passenger restraining position to its passenger releasing position in association with opening of the door or the like. By the term "passenger" as used herein is meant any person occupying a seat in a vehicle including a driver.

2. Description of the Prior Art

For the passive type seat belt system there have been proposed and used many latch devices designed to latch the runner in the passenger restraining position. However, many of the known devices are unsatisfactory as regards security and reliability. In an emergency such as a collision, the latch device is subjected to a strong impact force or deformation tending to cause a violent unlatching. The latch device should be safe against such accidental unlatching. Also, when load is applied to the webbing fastened to the runner, the webbing may run idly until it is completely latched, which can also be dangerous. The latch device should be designed to minimize such danger caused by idle running of webbing. It is always desired that the latch device be high in operational reliability and simple in structure. In these respects, many of the known latch devices have some problems.

SUMMARY OF THE INVENTION

Accordingly, it is a general object of the invention substantially to eliminate the problems involved in latch devices according to the prior art.

More specifically, it is an object of the invention to provide a latch device which has a high degree of security and reliability and is simple in structure.

Other and further objects, features and advantages of the invention will appear more fully from the following description taken in connection with the accompanying drawings.

BRIEF DESCRIPTION OF THE DRAWINGS

FIGS. 6 and 7 are partly sectional front views of the embodiment shown in FIG. 2 in two different positions of operation.

DESCRIPTION OF THE PREFERRED EMBODIMENTS

Figure 1:
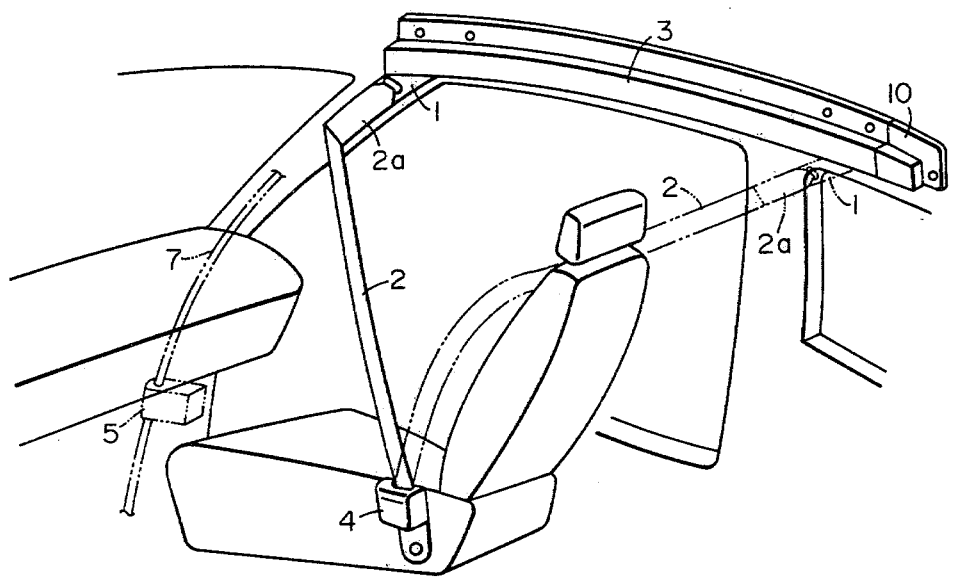
FIG. 1 schematically illustrates a passive type seat belt system to which the present invention is applied.

In FIG. 1, reference numeral 1 designates an anchor serving as a runner member. The anchor 1 is movable in association with opening and closing of a door or the like along a rail 3 between a passenger releasing position indicated by solid line and a passenger restraining position indicated by phantom line in the drawing. In the shown embodiment, sliding movement of the anchor is effected by the movement of a geared wire (FIG. 1) in a tube 7 with a motor (not shown) contained in a box 5. Of course, the anchor 1 may be mechanically moved making use of the force of opening and closing of the door. A webbing 2 extends from a retractor 4 to the anchor 1. The retractor 4 is fixed at the inner side of a seat. Alternatively, the retractor 4 may be fixed to the floor of the vehicle. If desired, it may be mounted movably forward and backward. At a portion near the connection between the anchor and webbing, the webbing 2 has a protection part 2a which protects the passenger's ear and neck region from being hurt by the webbing. The protection part 2a also facilitates getting on and off the vehicle.

At the rear end of the rail 3 there is provided a latch 10 which is the subject of the invention. Preferred embodiment of the latch device according to the invention will be described with reference to FIGS. 2 through 7.

Figure 2:
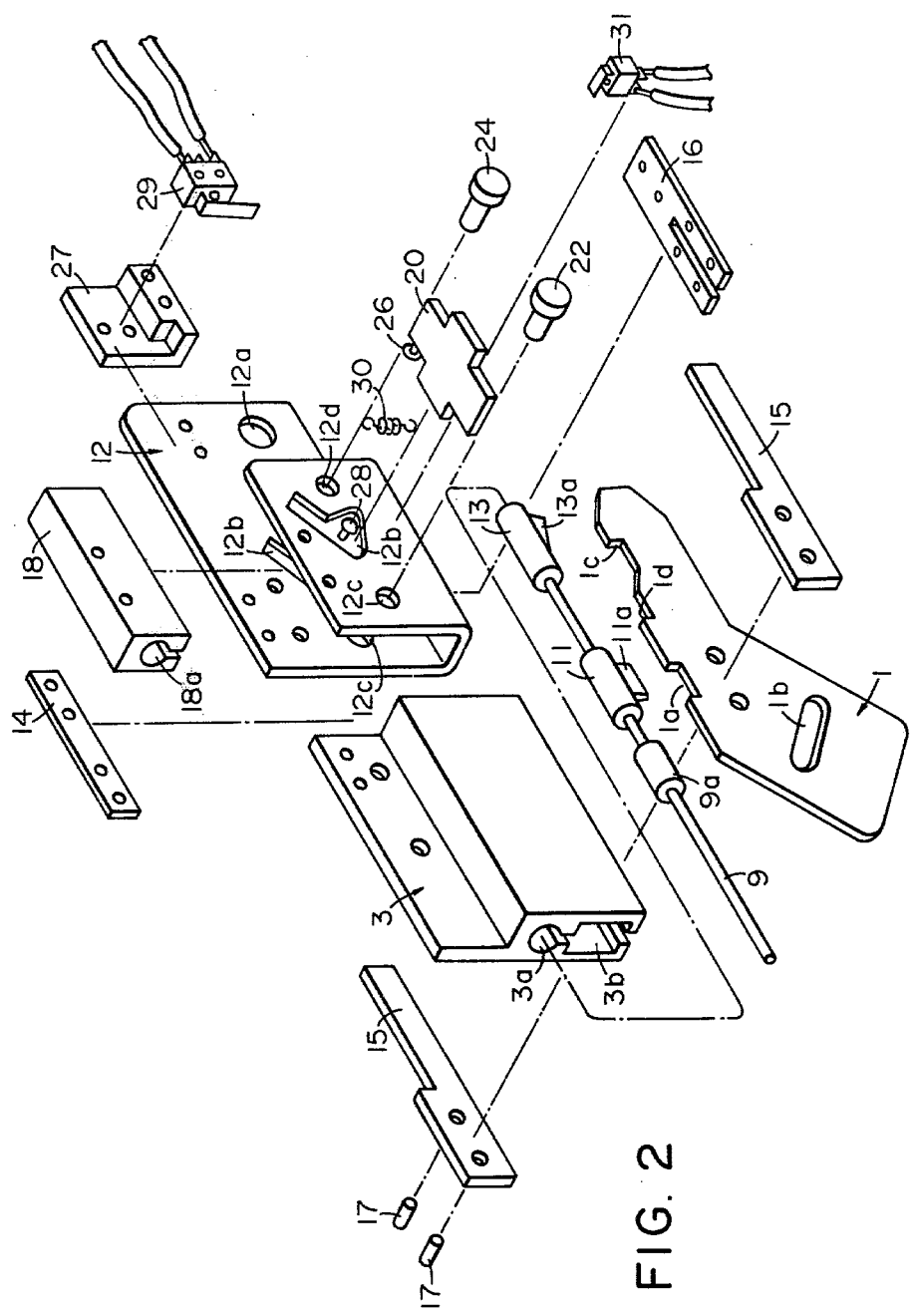
FIG. 2 is an exploded view of an embodiment of the invention.

As shown in FIG. 2, the rail 3 has a geared wire guide channel 3a and a anchor guide channel 3b provided therein. The geared wire 9 can move in the channel 3a. At the rear end (right hand end as viewed in the drawing) of the wire 9, the gearing spiral is omitted from the wire because at this end the wire need not engage with the driving gear (not shown) which rotates together with the rotation shaft of the abovementioned motor. Instead, at the rear end part, the wire 9 has a fixed cylinder 9a, forming a stop member, a slide cylinder 11 and a cam cylinder 13 fixed to the end of the wire. The slide cylinder can slide on the wire between cylinders 9a and 13, and has a projection 11a, while the cam cylinder has a cam 13a. The projection 11a is so formed as to fit into the upper recess 1a of the anchor 1 so that the anchor 1 and slide cylinder 11 can move together in the direction of extension of the wire. The projection 11a and the slide cylinder form connecting means between the anchor and the wire. To ensure a stable movement of the anchor 1, it is sandwiched between two slide bushes 15 connected thereto by pins 17. To fasten the webbing 2 to the anchor 1 there is provided an elongate opening 1b in the curved portion of the anchor. The curved portion extends forward and curves downward. The anchor 1 has also a notch 1c provided at the upper edge of the rear portion. The notch 1c is so formed as to mesh with a latch member 20 as described later.

A base member 12 is connected to the rear end of the rail 3 with connection plates 14 and 16. The base member 12 is fixed to the roof of the vehicle by a bolt or the like passing through the bore 12a provided in the base member. The front side part of the base member 12 is formed as a U-shaped portion which is connected with the anchor guide channel 3b of the rail 3. A guide block 18 is fixed to the upper side of the U-shaped portion in such manner that a wire guide channel 18a formed in the block 18 is in communication with the above-mentioned channel 3a in the rail 3. In the U-shaped portion there are further provided an opening 12b for supporting the latch member 20 and circular bores 12c and 12d formed before and behind the supporting opening 12b respectively. The latch member 20 is received in the supporting opening 12b to swing within a predetermined range. Guide pins 22 and 24 for the tongue part of anchor 1 are fitted into the bores 12c and 12d and caulked. The guide pin 22 serves also as a stop to the anchor 1 when the stop surface 1d of the anchor 1 comes into contact with the guide pin 22. The rearward and upward extending portion of the supporting opening 12b is used to mount the latch member 20 in the opening. The latch member 20 has a pin 26 fixed thereto and the base member 12 also has a pin 28 fixed thereto. Between pins 26 and 28 there is disposed a coil spring 30 which normally biases the latch member 20 to the position in which its rear side is inclined down, namely, to the position in which the latch member can engage in the notch 1c of the anchor 1.

To the rear end part of the base member 12 is fixed a stop member 27 having an electric switch such as limit switch 29 fixedly mounted thereto. The cam cylinder 13 on the geared wire 9 comes into contact with the stop member 27 and is stopped by it. Another electric switch such as limit switch 31 is provided under the supporting opening 12b in the base member 12 to signal engagement of the latch member 20 with the notch 1c of the anchor 1.

Figure 3:
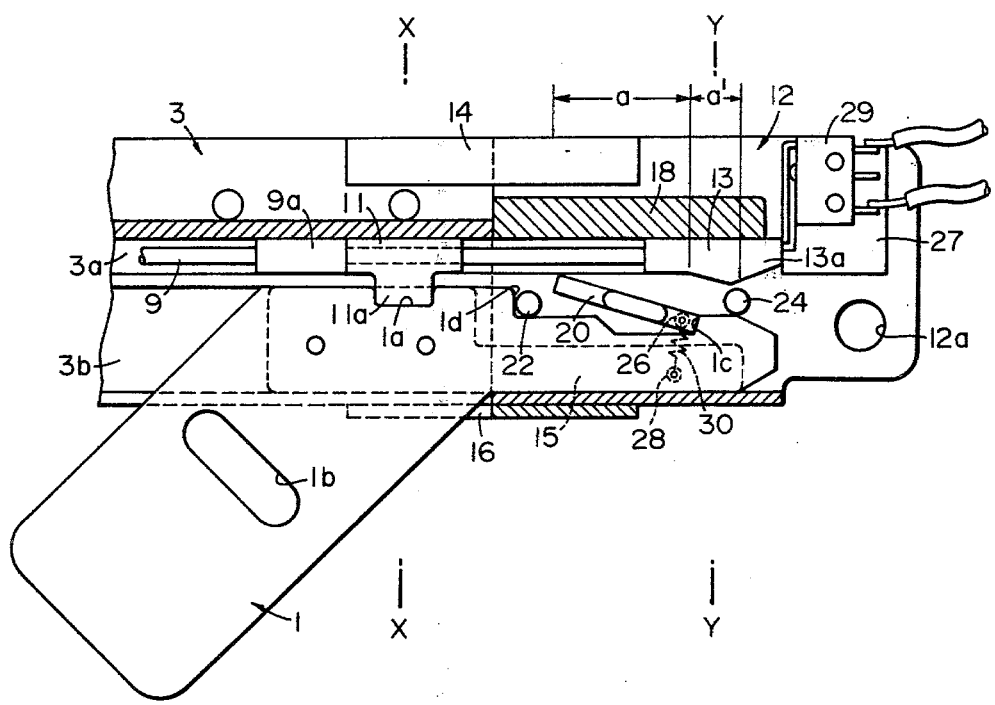
FIG. 3 is a partly sectional front view of the embodiment to illustrate the manner of operation thereof.

The manner of operation of the above embodiment is as follows:

Responsive to closing of the door or the like, the geared wire 9 is moved to move the anchor 1 toward the passenger restraining position from the passenger releasing position. As the wire 9 moves, the cylinder 9a fixed to the wire engages and pushes the slide cylinder 11 so that the anchor 1 is moved along the rail 3 together with the wire 9. When the anchor 1 enters the area of the latch 10, the leading end of the anchor 1 turns up the latch member 20 against the biasing force of the spring 30 and finally the latch member 20 engages in the notch 1c of the anchor 1. This condition is shown in FIG. 3. Almost simultaneously with the engagement, the stop surface 1d of the anchor abuts against the guide pin 22 which stops the anchor 1. At the same time, the leading edge of the cam cylinder 13 on the geared wire 9 actuates the limit switch 29 to stop the wire driving motor (not shown). Thus, the anchor 1 is held in the passenger restraining position.

In the passenger restraining position, if load is applied to the webbing 2, then the load will be recieved by the anchor 1, latch member 20, base member 12 and the vehicle body itself and will be absorbed by the vehicle body. Therefore, even when a heavy load is suddenly applied to the webbing 2 by an accident such as a collision, the anchor 1 is held securely latched. Even if the geared wire 9 is forcedly moved forward to some extent in such case, there is substantially no danger that the cam portion 13a of the cylinder 13 causes the latch member 20 to be disengaged from the notch 1c. This is because the distance which the wire 9 should be moved to cause such unlatching, that is, the distance a+a' in FIG. 3 is sufficiently large.

When the latch member 20 comes into the position shown in FIG. 3, the limit switch 31 is also actuated. The limit switch may be connected with an alarm lamp which is turned off by the above actuation of the limit switch. By doing so, a signal can be given the passenger as to whether the latch device is in operation or not.

Figure 4:
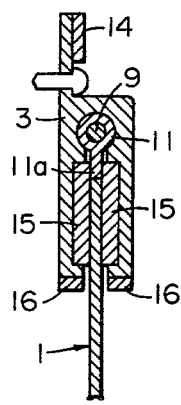
FIG. 4 is a sectional view along the line X—X in FIG. 3.
Figure 5:
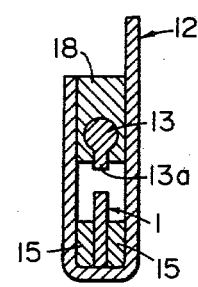
FIG. 5 is a sectional view along the line Y—Y in FIG. 3.

For a better understanding of the embodiment shown in FIG. 3, its section taken along X—X is shown in FIG. 4 and section along Y—Y is shown in FIG. 5.

In the position shown in FIG. 3, the wire driving motor is off as described above. When the door is opened or by other interrelated motion, the motor starts rotating in the reversed direction. By this reversed rotation of the motor, at first the wire 9 and only the cylinders 9a and 13 fixed to the wire are pulled back. When the wire 9 has moved the above-mentioned distance (a+a'), the cam 13a gradually turns the latch member 20 about the pivot 20a counter-clockwise to the position shown in FIG. 6.

In the position shown in FIG. 6, the rear end surface of the slide cylinder 11 is in contact with the front end surface of the cam cylinder 13, and the latch member 20 is disengaged from the notch 1a of the anchor 1. Therefore, the slide cylinder 11 and the anchor 1 are then also moved back together with the wire 9 when it is moved past the position shown in FIG. 6 by the motor rotating in the reversed direction. A position in the course of this movement is shown in FIG. 7. In this position, when a force indicated by arrow F is applied to the anchor 1, the latter can move the distance b shown in FIG. 7. In this manner, the anchor 1 finally reaches the passenger releasing position at which an electric switch such as limit switch (not shown) is actuated to stop the wire driving motor again.

As readily understood from the foregoing, the present invention provides a latch device for a runner member which has high degree of security and reliability in operation and which is simple in structure.

While the invention has been particularly shown and described with reference to a preferred embodiment thereof, it will be understood by those skilled in the art that the foregoing and other changes in form and details can be made therein without departing from the spirit and scope of the invention.

I claim:

1. Latching apparatus for a runner member in a passive type seat belt system comprising:

a longitudinally extending guide member;

a runner member mounted on said guide member for movement therealong, the runner member having an engaging portion and a webbing attachment portion;

a driving member movable responsive to closing and opening of a vehicle door or the like to move said runner member between a passenger restraining position and a passenger releasing position;

a cam member fixed to a free end portion of said driving member;

a stop member fixed to the driving member spaced inwardly from the cam member;

connecting means between said runner member and said driving member, the connecting means being slidable relative to said driving member within a predetermined range between the stop member and the cam member;

a base member fixed to a body of the vehicle adjacent the passenger restraining position of the runner member; and a latch member movably mounted on said base member between an engaging position in which the latch member is engageable with the engaging portion of the runner member to connect the runner member with the base member, and a nonengaging position, the latch member being normally biased toward the engaging position;

movement of the driving member in one direction being effective to bring the stop member into engagement with the connecting means for moving the runner member into the passenger restraining position wherein the latch member engages said engaging portion of the runner member, and movement of the driving member in the opposite direction being effective initially to cause the cam member to move the latch member out of engagement with the runner member and then to move the runner member from the passenger restraining position towards the passenger release position by engagement of the cam member with the connecting means.

2. Apparatus as defined in claim 1, wherein the connecting means comprises a slide member mounted on the driving member between the stop member and the cam member, and a connection between the slide member and the runner member.

3. Apparatus as defined in claim 1, wherein the base member is provided with stop means for stopping the runner member when the runner member is in engagement with the latch member.

4. Apparatus as defined in claim 1, wherein the base member is provided with a stop for stopping the driving member when the driving member brings the runner member into engagement with the latch member.

5. Apparatus as defined in claim 1, wherein the base member includes means for signaling when the runner member is engaged with the latch member.

* * * * *